United States Patent
Van Woerdekom

(10) Patent No.: US 9,509,951 B2
(45) Date of Patent: Nov. 29, 2016

(54) SWITCHING APPARATUS FOR SWITCHING COMPRESSED VIDEO STREAMS, CONFERENCE SYSTEM WITH THE SWITCHING APPARATUS AND PROCESS FOR SWITCHING COMPRESSED VIDEO STREAMS

(71) Applicant: Robert Bosch GmbH, Stuttgart (DE)

(72) Inventor: Antonie Van Woerdekom, Veldhoven (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/775,896

(22) PCT Filed: Mar. 15, 2013

(86) PCT No.: PCT/EP2013/055361
§ 371 (c)(1),
(2) Date: Sep. 14, 2015

(87) PCT Pub. No.: WO2014/139581
PCT Pub. Date: Sep. 18, 2014

(65) Prior Publication Data
US 2016/0014374 A1    Jan. 14, 2016

(51) Int. Cl.
| | | |
|---|---|---|
| *H04N 7/14* | (2006.01) |
| *H04N 7/15* | (2006.01) |
| *H04N 21/234* | (2011.01) |
| *H04N 21/44* | (2011.01) |
| *H04N 19/40* | (2014.01) |
| *H04L 12/18* | (2006.01) |

(52) U.S. Cl.
CPC ............ *H04N 7/15* (2013.01); *H04L 12/1822* (2013.01); *H04N 19/40* (2014.11); *H04N 21/23424* (2013.01); *H04N 21/44016* (2013.01)

(58) Field of Classification Search
CPC ........ H04N 7/15; H04N 7/147; H04N 7/152; H04N 7/155; H04N 7/142
USPC ................................ 348/14.01, 14.08, 14.15
See application file for complete search history.

(56) References Cited

U.S. PATENT DOCUMENTS

| | | | |
|---|---|---|---|
| 7,876,996 B1 * | 1/2011 | Herz | H04N 5/76 386/203 |
| 8,402,494 B1 * | 3/2013 | Hu | H04N 5/268 709/230 |

(Continued)

FOREIGN PATENT DOCUMENTS

| | | |
|---|---|---|
| EP | 1633120 | 3/2006 |
| EP | 1686835 | 8/2006 |

OTHER PUBLICATIONS

International Search Report for Application No. PCT/EP2013/055361 dated Jun. 17, 2013 (2 pages).

*Primary Examiner* — Quoc D Tran
(74) *Attorney, Agent, or Firm* — Michael Best & Friedrich LLP

(57) ABSTRACT

Conference systems are used to support discussions in meeting rooms or plenary halls, whereby the conference systems usually comprise a plurality of delegate units for participants of the discussion. It is furthermore known, that conference systems comprise a display for displaying the active speaker in a conference. Especially in large conferences with a plurality of participants more than one camera is used for viewing the different active speakers to be displayed on the display. A switching apparatus (9) for switching compressed video streams, the switching apparatus (9) comprising: at least two inputs IN1, IN2, each input being operable to receive an input video stream from a camera (7), an output OUT for outputting an output video stream, whereby the input video streams are compressed video streams, whereby each compressed video stream is represented by a sequence of groups of frames GoF, whereby each group of frames GoF comprises a key frame I and at least one inter frame X, a switching module (12) operable to receive a switch request SR and to switch the input video streams in the output video stream, so that a first video stream of the input video streams is stopped and a second video stream of the input video streams is started, whereby the output video stream is a compressed video stream.

17 Claims, 5 Drawing Sheets

(56) References Cited

U.S. PATENT DOCUMENTS

2003/0098819 A1* 5/2003 Sukthankar ............ G09G 3/002
 345/1.1

2006/0045363 A1* 3/2006 Dei ........................ H04N 7/152
 382/232
2006/0280182 A1* 12/2006 Williams .............. H04J 3/0632
 370/394

* cited by examiner

SWITCHING APPARATUS FOR SWITCHING COMPRESSED VIDEO STREAMS, CONFERENCE SYSTEM WITH THE SWITCHING APPARATUS AND PROCESS FOR SWITCHING COMPRESSED VIDEO STREAMS

BACKGROUND OF THE INVENTION

The invention refers to a switching apparatus for switching compressed video streams. More specifically the invention refers to a switching apparatus for switching compresses video streams, whereby the switching apparatus comprises at least two inputs, each input being operable to receive an input video stream from a camera, an output for outputting an output video stream, whereby the input video streams are compressed video streams, whereby each compressed video stream is represented by a sequence of groups of frames, whereby each group of frames comprises a key frame and at least one inter frame, and a switching module operable to receive a switch request and to switch the input video streams in the output video stream, so that the first video stream of the input video streams is stopped and a second video stream of the input video streams is started. The invention also refers to a conference system with the switching apparatus and to a process for switching compressed video streams.

Conference systems are used to support discussions in meeting rooms or plenary halls, whereby the conference systems usually comprise a plurality of delegate units for participants of the discussion. Each delegate unit comprises a microphone, so that the participant can speak into the microphone, whereby the speech signal as an audio signal is amplified by the conference system and emitted by loudspeakers or headphones, so that the other participants can listen to the speech signal.

Such a conference system with a plurality of delegate units is for example disclosed in the document EP 1686835A1. The delegate units of the conference system are connected by a audio communication network.

It is furthermore known, that conference systems comprise a display for displaying the active speaker in a conference. Especially in large conferences with a plurality of participants more than one camera is used for viewing the different active speakers to be displayed on the display.

SUMMARY OF THE INVENTION

According to the invention a switching apparatus, which is operable and/or adapted to switch compressed video streams, especially compressed input video streams, in an output video stream is disclosed. The switching apparatus may be realized as an electronic component, as a data processing component like a computer or as a electronic-data processing component.

The switching apparatus comprises at least two inputs. Preferably the inputs are realized as signal interfaces. Each input is operable, especially adapted to receive an input video stream from a camera. The camera may be realized as a black and white camera or as a color camera or as a 3D camera. The cameras are especially realized as digital cameras providing digital video streams. It is possible, that the switching apparatus comprises more than two inputs in case more cameras are provided.

Furthermore the switching apparatus provides an output for outputting an output video stream. Preferably the output is realized as a signal interface. Preferably the switching apparatus provides only one single output for outputting the output video stream. For example the inputs and/or the output can be realized as plug(s) or socket(s) for receiving cable-bound line(s). Alternatively the input and/or the output can be realized as wireless interface(s) for receiving wireless line(s).

The input video streams are compressed video streams. Especially they are temporal compressed video streams. Each compressed video stream is represented by a sequence of groups of frames—also called groups of pictures (GoPs). Each group of frames comprises a key frame and at least one inter frame. In other words the frames are sorted groupwise, whereby each group starts with the key frame followed by at least one inter frame. It is preferred, that the key frame is a temporal uncompressed frame and that the at least one inter frame is a temporal compressed frame being dependent from the key frame. By decoding the compressed video streams the at least one inter frame needs data from the key frame in order to be decoded correctly.

The switching apparatus comprises a switching module, which is operable, especially adapted, to receive a switch request, whereby the switching module is operable/adapted to switch the input video streams in the output video stream as a reaction to the switch request. The switching of the input video streams in the output video stream is implemented by stopping the transmission of a first video stream of the input video streams and by starting the transmission of a second video stream of the input video stream into the output stream. Prior to the switch request the first video stream is transmitted to the output stream. After the switch request the second video stream is transmitted to the output video stream.

According to the invention it is proposed that the output video stream is also a compressed video stream, especially a compressed video stream as defined above. The switching of the input video stream in the output video streams is thus realized without decoding, i.e. with inserting the encoded frames of the input video streams in the output video stream. Summarized, the invention discloses a switching apparatus, which is operable to switch between temporal compressed video streams, whereby the input video streams are switched in the output video stream and whereby the output video stream is still compressed.

It is one thinking of the invention, that changing input video streams is not only an issue for watching recorded videos, but also an issue for real time applications. Especially in the field of real time applications switching of input video stream is time consuming and not time deterministic. Reference is made to an example concerning a PC which can capture and decode a video stream from a first source. When a switch is requested, the PC can stop decoding the first source, set up a stream from a second source and start decoding that video stream from the second source. The time between stopping and initializing and starting the video stream of the second video stream is not deterministic. A deterministic but resource consuming solution would be, that the PC gets the compressed video streams from both sources at the same time and decodes both video streams also at the same time. When the switch is requested, the PC simply starts displaying the video from the new source. There will be no switch delay and no time that the video is frozen. But the requirement that the PC decodes both video streams simultaneously is resource consuming and can incur a high processing load.

It is one advantage of the invention that the switching apparatus allows a switching of the compressed input video streams in the compressed output streams. From the view of a decoding apparatus, for example a receiver, only the compressed output video stream is received, so that the decoding is not resource consuming and not non-deterministic initialization of a new video stream is necessary.

According to a preferred embodiment of the invention it is proposed, that the switching module is operable, especially adapted, to start the transmission of the second video stream in the output video stream with a key frame. In other words the first frame transmitted from the second video stream to the output video stream is not one of the inter frames but one of the key frames. In case of using an inter frame of the second input video stream, this inter frame would be decoded against the last frames received from the first video input stream, which would lead to meaningless decoded frames.

It is furthermore preferred, that the switching module is operable to stop the transmission of the first input video stream after a frame (of the group of frames) is completely transferred to the output video stream and before the transfer of a next frame of the first input video stream to the output video stream is started. It is alternatively or furthermore preferred, that the transmission of a second input video stream starts with a complete or entire frame of the group of frames. This preferred embodiment respects that just replacing the first input video stream by the second input video stream in the output video stream could lead to a not valid compressed output video stream. Possible errors, which can occur, are that the first input video stream is stopped halfway the transmission of a frame and/or that the second input video stream starts transmitting halfway the transmission of a frame. With the restriction to start and to stop with completed frames, such errors are prevented. Therefore it is preferred, that the switching apparatus, especially the switching module, is operable, especially adapted, to receive data over the inputs until all packets of a frame of the first input video stream have been received and transmit the complete frame as a last frame to the output video stream.

In a preferred embodiment the key frame is a so called I-frame or intra frame and that the inter frame is a P-frame or a B-frame and/or that the video streams are compressed according to the MPEG standard, especially of H.264, H.265, MPEG-1, MPEG-2, MPEG-3 or MPEG-4 etc.

In the first possible realization of the invention, the switching apparatus is operable to be connected to the inputs of the first and of the second video stream simultaneously, while the first video stream is stopped in the output video stream and while the second video stream is started in the output video stream. In this embodiment the switching apparatus always receives video streams from all inputs.

Alternatively it is possible, that the switching apparatus is operable to disconnect the input of the first video stream, as soon as the first video stream is stopped in the output video stream and to connect the input of the second video stream, as soon as the second video stream shall be started in the output video stream. In this realization only one of the inputs receive video stream data, whereby the other input or inputs are de-activated. These possible realizations as indicated above have the advantage, that a real-time switching of the input video streams is possible. On the other hand side both realizations have the disadvantage, that the output video stream has a gap between stopping the first input video stream and starting the second video input stream, because the first video input stream is preferably stopped as soon as the last frame after receiving the switch request is completely transferred to the output video stream and the switching module has to wait until a key frame of the second input video stream arrives. So the two realizations results in a still picture from the first video input stream until the key frame from the second input video stream is received.

In order to overcome this disadvantage it is preferred, that the switching apparatus comprises a cache module for caching the second video stream.

Preferably the cache module is organized in a FIFO-structure (first-in-first-out). The switching module is operable to start the transmission of the second video stream in the output stream with a cached key frame from the cache module followed by the other frames of the second video input stream according to the correct sequential arrangement. With this realization the still picture from the first video input stream is prevented.

A possible disadvantage of this realization is, that instead of a time gap between the last frame of the first input video stream and the first key frame of the second input video stream, a negative time lag is produced by the switching apparatus for each switching process of the input video streams. In case only a few switching processes are performed, this negative time leg is acceptable. But as at each switching process the time lag can be increased, the switching processes could lead to a situation in which the real time requirements are not met.

In order to control the real-time requirements of the output video stream it is preferred, that the switching apparatus comprises a time stamp module, which is operable to adapt the time stamps on the second video stream, so that the adapted time stamps correspond in time with the time stamps of the first video stream in the output video stream. So as soon as the second input video stream is transmitted to the output stream its time stamps are patched and thereby replaced by adapted time stamps which corresponds to the time stamps of the first input video stream. With this realization it is secured, that the time stamps of the compressed frames arrive at a receiver contiguous, even if the time stamps of the first and second input video streams are unrelated. In this connection it shall be underlined, that the frame capture time on each camera can be independent. Although each camera will (probably) be capturing at the same rate, there may be a phase difference. Also, there might be a very small difference in the capture rate, if the cameras use free running clocks as the capture clock. The time stamp module allows to adapt the two input video streams in view of their time stamps.

In a possible embodiment of the invention, the temporal distance between the adapted time stamps is the same as the temporal distance between the original time stamps of the second video stream. In this embodiment the time for a section of the second input video stream is the same regardless whether the original time stamps or the adapted time stamps are used by decoding this section. This possible embodiment prevents a still picture of the last frame of the first input video stream but leads to a delay of the display of the second input video stream.

In a preferred development of the invention the temporal distance between the adapted time stamps is smaller than the temporal distance between the original time stamps of the second video stream until the delay caused by the caching of the second video stream and using a key frame "from the past" is compensated. As explained above, using a key frame which is prior to the last frame of the first input video stream transmitted to the output video stream leads to a negative time lag. According to this development of the invention the speed of displaying the second input video stream is higher than the recording speed of the second input video stream as long as the negative time lag exists. In a possible realization the cached data is sent out at a higher speed than normal (e.g.

1.25 times real time speed). The adapted time stamps are selected such that the receiver will decode at this higher speed. Once the cache has been emptied, data is sent to the output video stream at normal speed, and the time stamps are selected as corresponding to real time speed. This switching structure has the advantage of almost immediate switching at the cost of a little additional latency. However, the latency is removed within a few seconds.

It is especially preferred, that the switching apparatus is adapted to work in real time and/or that the video streams are live video streams. Especially the output video stream is a live video stream of scenes captured by the cameras. It is furthermore preferred, that the switching apparatus comprises the cameras, which are especially realized as network and/or digital cameras.

In a further preferred embodiment of the invention, the switching apparatus, especially the switching module is adapted to send a request to the camera providing the second video stream for requesting a key frame. In this situation, the switching apparatus does not need to wait passively for a key frame to arrive, instead the switching apparatus actively requests the camera to insert a key frame immediately. This embodiment can lower the time that the switching apparatus has to wait for the key frame from the second input video stream.

A further subject matter of the invention is a conference system with a plurality of delegate units, whereby each delegate unit comprises a microphone for a speaker, and with a plurality of cameras, whereby each camera provides a video stream, and a display. The conference system furthermore comprises the switching apparatus as disclosed before, whereby the plurality of cameras are connected to the inputs and the display is connected to the output. The display may comprise a receiver for decoding the compressed video stream.

In a preferred development of the invention the conference system comprises a control module for controlling the switching apparatus and a first of the cameras is aimed at a first delegate unit and a second of the cameras is aimed at a second delegate unit and. The control module is operable to send the switch request to the switching apparatus for switching from the input video stream of the first camera to the input video stream of the second camera to the output video stream in dependency from switching the first delegate unit as the old active delegate unit to the second delegate unit as the new active delegate unit. In other words, as soon as the speaker at the first delegate unit deactivates his delegate unit and the speaker of the second delegate unit activates his delegate unit, the video streams of the cameras are synchronously switched, so that the active speaker is displayed on the display.

BRIEF DESCRIPTION OF THE DRAWINGS

A further subject matter of the invention is a process for switching video streams with the switching apparatus or with a conference system as disclosed before.

Further features, advantages and effects of the invention will become apparent by the description of preferred embodiment of the invention. The figures show.

DETAILED DESCRIPTION

Figure 1:
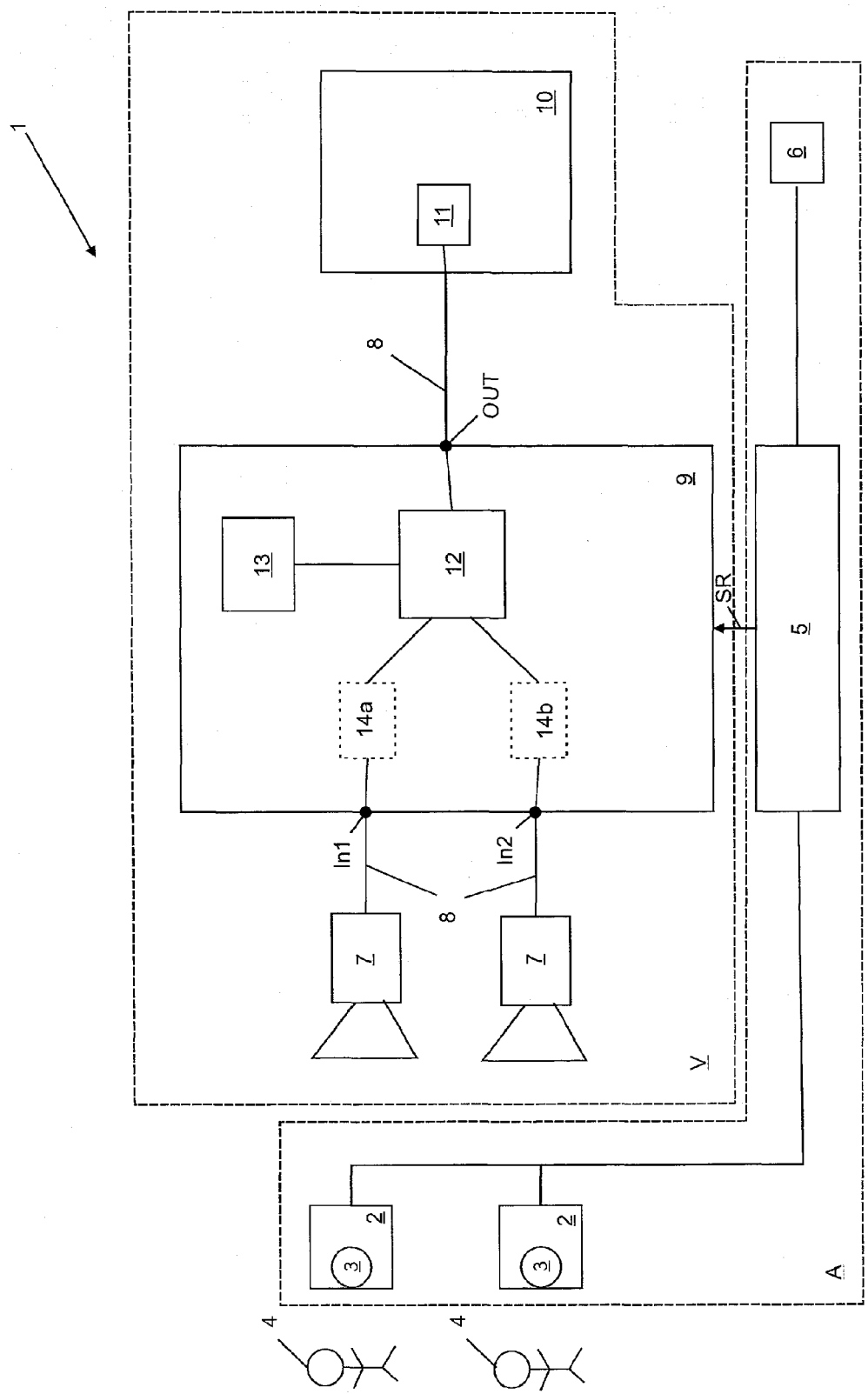
FIG. 1 a block diagram of an overview of a conference system with a switching apparatus as an embodiment of the invention.
Figure 2:
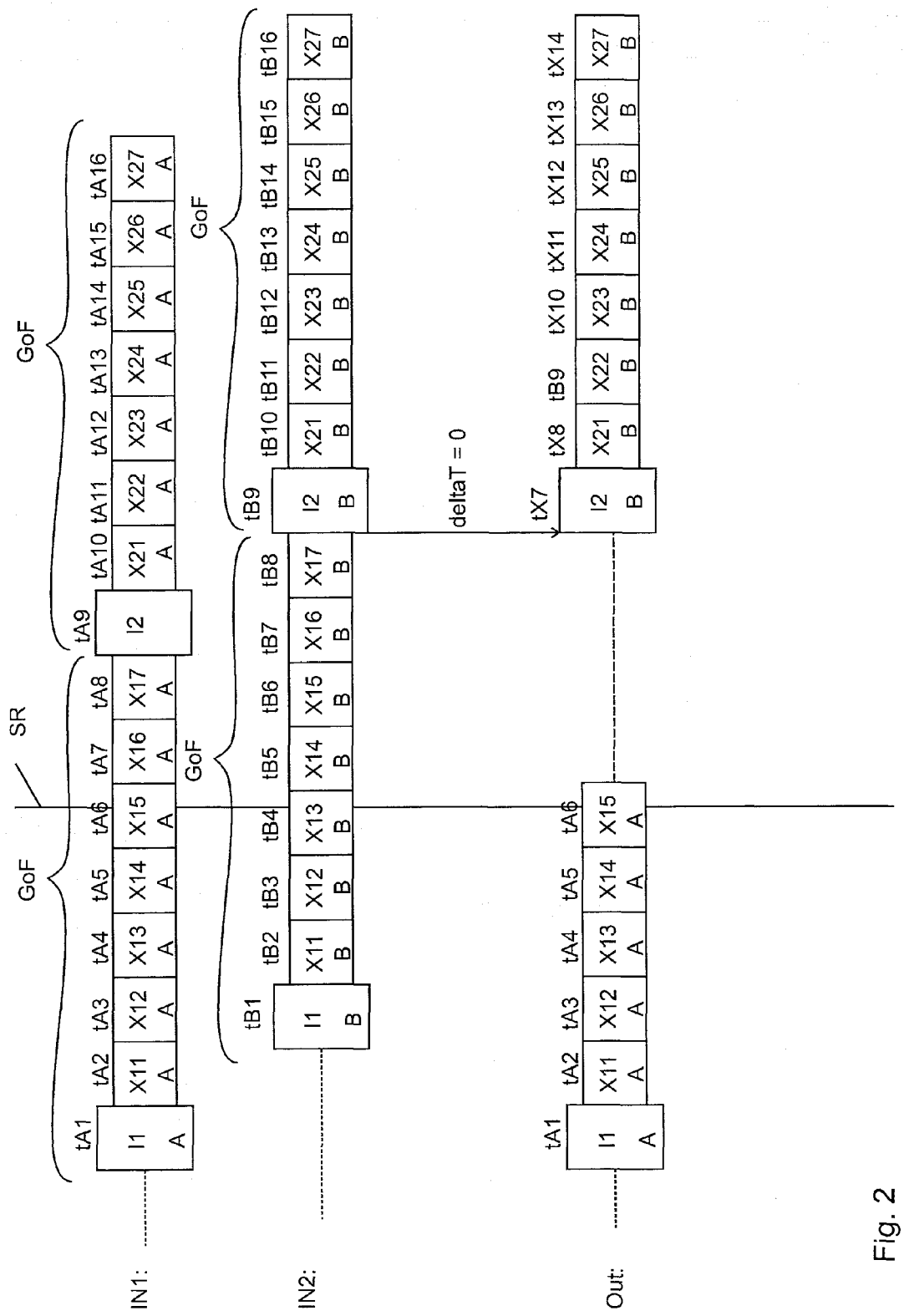
FIG. 2 a schematic illustration of a process for switching compressed video streams of the conference system/switching apparatus in FIG. 1.

FIG. 1 shows a schematic block diagram of a conference system 1 as an embodiment of the invention. The conference system 1 comprises a plurality of delegate units 2 each having a microphone 3 for receiving a speech signal of a participant 4 of a discussion. The conference system 1 is operable to support a discussion in a plenary hall or a meeting room or the like. The speech signals of the participants 4 are converted into audio signals from the delegate units 2 and transferred to a control module 5. The control module 5 is operable to amplify the audio signal and to emit the amplified audio signal by a loudspeaker 6. This part of the conference system is the audio section A.

The conference system 1 furthermore has a video section V, which comprises a plurality and at least two cameras 7 especially network cameras, which are directed at the delegate units 2 and thus to the participants 4 using the delegate units 2. The cameras 7 are connected by a network 8 with a switching apparatus 9, whereby the switching apparatus 9 comprises inputs IN1 and IN2 for connecting with the cameras 7. The data can be streamed over the network for example using the RTP protocol with the associated binding for the temporal compression standard. The network 8 is especially realized as a LAN or as a WLAN. The switching apparatus 9 comprises a single output OUT, which is connected over the network 8 with a display 10, which allows to display the scene captured by the cameras 7. The switcher apparatus can set up its stream with the cameras 7 using the RTSP protocol. The stream output can be a unicast or a multicast stream.

The conference system 1 is operable to display a video of the participant 4 speaking, so that the other participants of the discussion can see the speaking participant 4 in real time during his speech. The control module 5 sets one of the delegate units 2 as an active delegate unit, whereby the audio signal from the active delegate unit 2 is amplified and emitted as amplified audio signal over the loudspeakers 6. Furthermore the control module 5 sends a switch request SR to the switching apparatus 9 in order to select the camera 7, which is directed to the active delegate unit 2 as a source for the video displayed on the display 10. In case the active delegate unit 2 changes, the control module 5 sends a further switch request to the switching apparatus in order to switch to the camera 7, which is directed to the new active delegate unit 2.

As the audio signal and the video must be emitted synchronously to each other, the transmitting and the switching of the videos must be realized in real time. Real time is preferably defined so that an average and/or maximum delay between the emitted audio signal and/or the emitted display signal relative to the speech signal is less than 1 second, especially less than 0.5 seconds, preferably less than 0.1 seconds.

The cameras 7 are realized as network cameras and provide a compressed video stream, which is transferred over the network 8. The compressed video streams, which are received by the inputs IN1 and IN2 are shown on the first two lines of the FIGS. 2-5 to explain their structure.

The frames of the compressed video streams are arranged group wise, whereby each group of frames GoF comprises a first key frame indicated by I followed by a plurality of inter frames indicated by X. The key frame I1, 12 represent uncompressed frames of the video stream, the inter frames X represent compressed frames, which are dependent from the key frames I1, 12 of the same group. The video streams are compressed according a MPEG Standard. In the first line a first input video stream A is shown, which is received by the input IN1, in the second line a second input video stream B is shown, which is received by the input 2.

The third line indicated by "out" shows a compressed output video stream, which is transmitted from the output OUT to the display 10, where it is decoded by a receiver 11. It shall be underlined, that the switching apparatus 9 switches the first and the second input video stream A, B in the output video stream without decoding the compressed video streams. The switching of the first and second input video stream in the output video stream is executed in a switching module 12.

The vertical line SR in FIGS. 2-5 indicates the point of time of the switch request SR from the control module 5. With the switch request SR the first input video stream A shall be stopped and the second input video stream B shall be started in the output video stream. As it can be seen from FIG. 2 the line SR crosses through the frame X15 of the first input video stream A. The switching module 12 is adapted to stop the transmission of the first input video stream A to the output video stream after the frame X15 is completely transferred to the output video stream. When transmitted on the network 8, each frame, where each frame has a different bite count, is divided into one or more network packets resulting in the network stream like $1_{1A}$, $1_{1B}$, $1_{1C}$, $1_{1D}$, $X_{11A}$, $X_{11B}$, $X_{12A}$, $X_{12B}$, $X_{12C}$, $X_{13A}$ . . . In order to prevent to transmit a frame halfway to the output video stream the switching module 12 receives data packages from the network 8 until all packets of the frame have been received. After the transmission of the last frame from the first input video stream A to the output video stream the transmission is stopped.

In a next step the switching module 12 waits until an intra frame I is received from the second input video stream B, otherwise any non-intra frame of the second input video stream B would be decoded from the receiver 11 against the last frames received from the first input video stream. As soon as a first intra frame I is received, the first intra frame and the following frames of the second input video stream B are transmitted to the output video stream.

In the resulting output video stream the real time requirement is fulfilled, as no time delay or nearly no time delay between the frames of the second input video stream B and the output video stream occurs, so that deltaT=0. But between the last frame from the first input video stream A and the first frame of the second input video frame B is a time period without frames, so that due to that gap the last frame of the first input video stream A will be displayed on the display 10 as a still picture.

Figure 3:
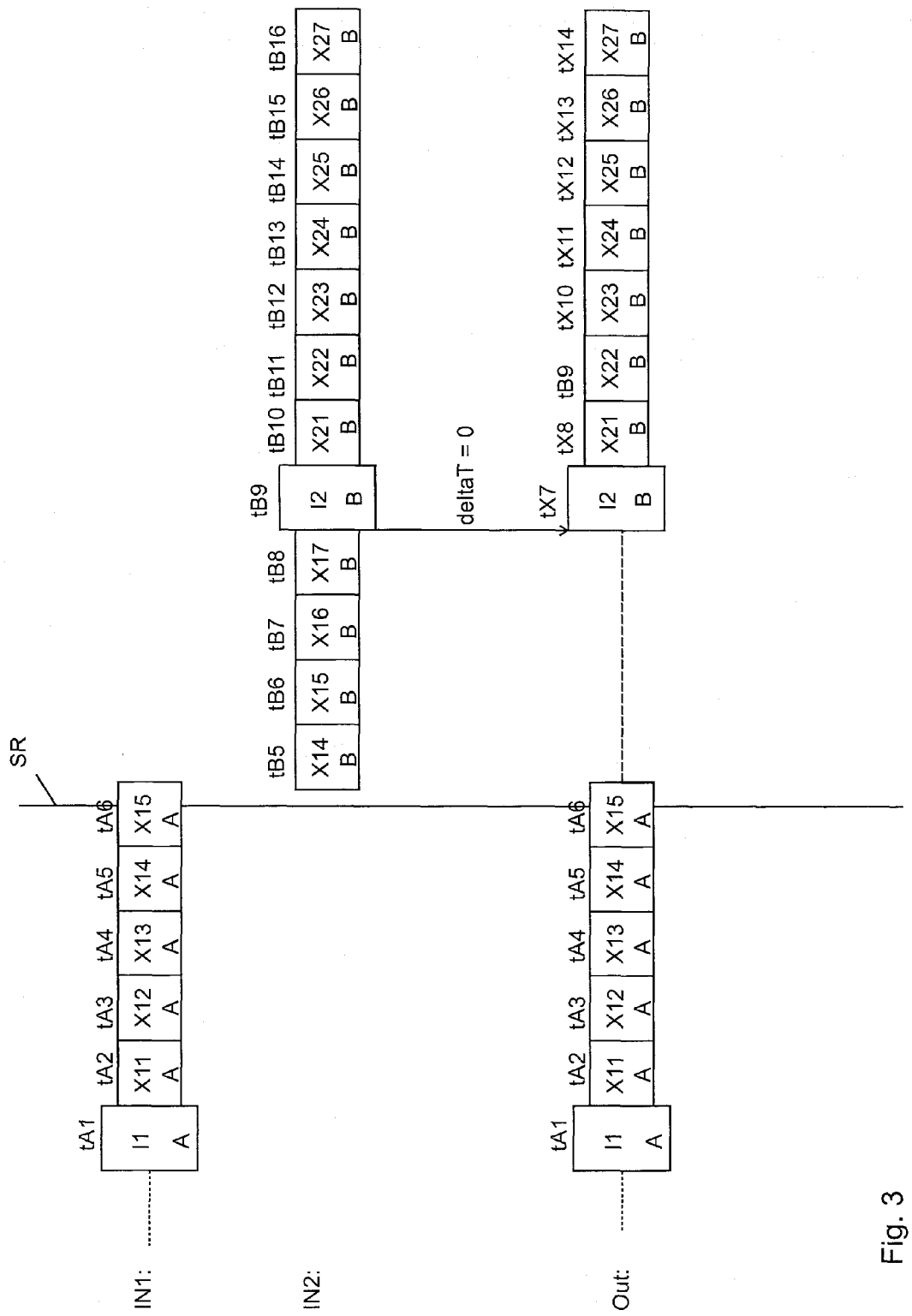
FIG. 3 a schematic illustration of a further process for switching compressed video streams of the conference system/switching apparatus in FIG. 1.

FIG. 3 shows a slightly amended version of the function of the switching apparatus 9, whereby the cameras 7 are connected and disconnected in dependency from the switching situation. After receiving the switching command SR the input IN1 is disconnected and the input IN2 is connected. Also in this embodiment the disconnection of the input IN1 is performed after all packets of the last frame of the first input video stream A are received.

After connecting the input IN2 the switching module 12 waits to receive a first intra frame 12, which is the starting point for transmitting the second input video stream B into the output video stream.

As is can be seen in FIG. 1, the switching apparatus 9 comprises a time stamp module 13, which is operable to patch the time stamps t of the second input video stream B. The time stamps define the temporal position of the frames in the video streams. Especially, the time stamps define the temporal distance between two successive frames in the video streams. As a change of the time stamps series in a video stream could lead to problems with the receiver 11 by decoding the video stream, the time stand module adapts the original time stamps TB5 . . . TB16 . . . to adapted time stamps TX? . . . TX14, which correspond to the time stamps TA1 . . . TA6 of the first input video stream A or, respectively, the time stamps in the output stream. In case the video streams are switched more than once, the time stamp module 13 orientates the adaption, especially the numbering of the time stamps by the time stamps of the video stream previously transmitted by the output video stream. The temporal distance of the time stamps is defined by the input video streams in order to display the videos at the same speed as they were recorded by the cameras 7.

Figure 4:
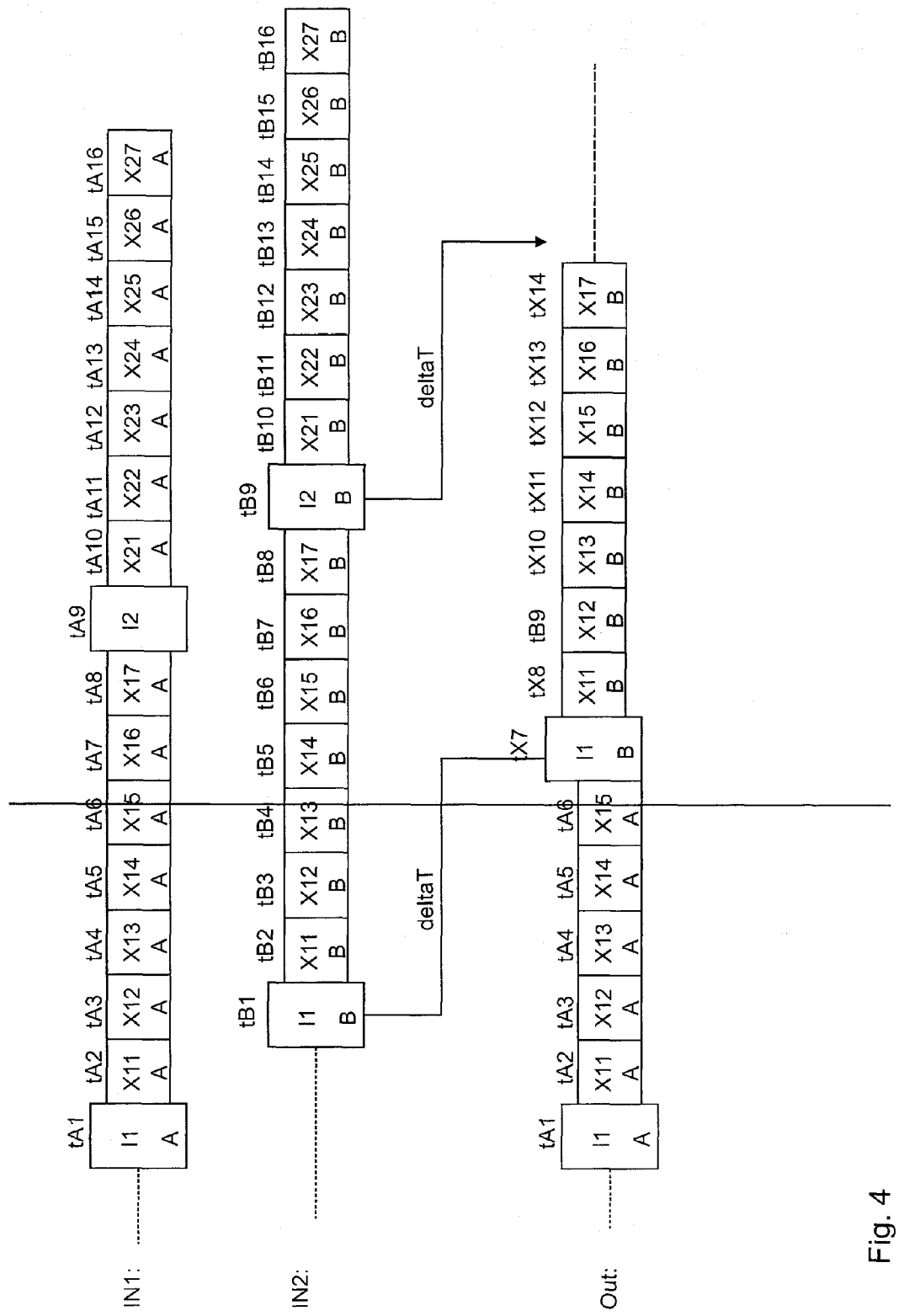
FIG. 4 a schematic illustration of a further process for switching compressed video streams of the conference system/switching apparatus in FIG. 1.

In FIG. 4 a further embodiment is shown, whereby the switching apparatus 9 uses cache modules 14a, b (FIG. 1), which are operable or adapted to cache the incoming input video streams. As soon as the switch request SR arrives, the switching module 12 searches for the last intra frame I1 in the cache module 14b and requests this intra frame I1 and the following frames from the cache module 14b. As it can be seen from the output video stream the appearance of a still picture is prevented, as the switching module 12 can start transmit frames from the second input video stream B at once. But due to the fact that the intra frame I1 from the past was taken, the output video stream will have a negative time lag deltaT compared to the incoming input video stream B. As this deltaT is accumulating for each switch process, the time lag increases in dependence of the number of switches.

Figure 5:
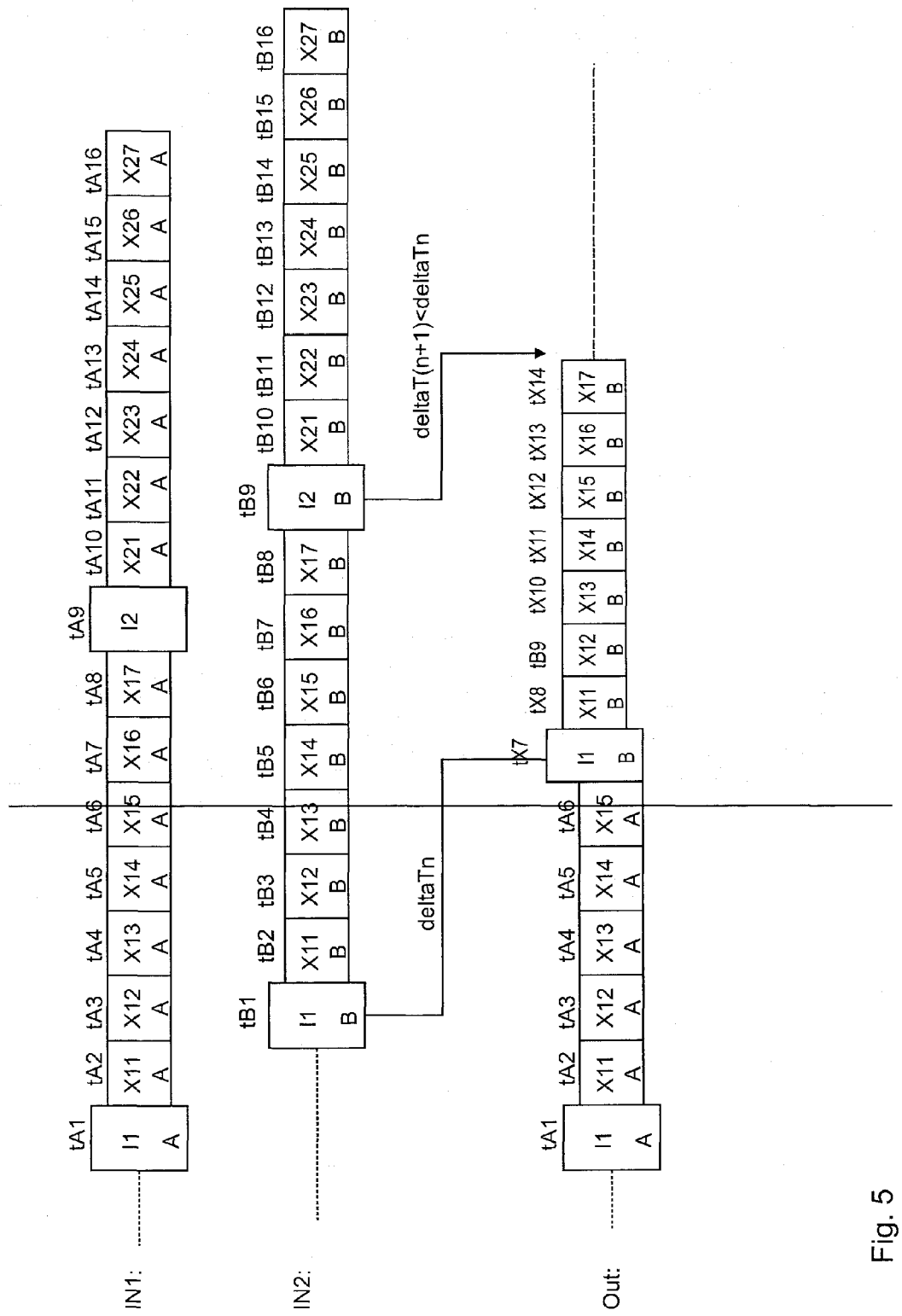
FIG. 5 a schematic illustration of a further process for switching compressed video streams of the conference system/switching apparatus in FIG. 1.

FIG. 5 shows a further embodiment of the invention, whereby this negative effect is prevented by manipulating the temporal distance between the time stands by the time stamp module 13. As it can be seen by FIG. 5, the time stamps are adapted, so that the frames are displayed in a higher speed, so that over some seconds, preferably less than 10 seconds, the time lag deltaT is reduced. For each following GoF(n+1) the absolute value of the new time lag deltaT(n+1) is smaller than the absolute value of the previous time lag deltaT(n). This manipulation of the temporal distance of the time stamps is executed as long as the frames are taken from the cache module 14b or as long as deltaT>0. As soon as the cache module 14b is emptied, the output video stream is in real time again and the temporal distance of the time stands are again the same as the temporal distances of the time stamps of the second input video stream B.

In order to minimize the effects caused by waiting for the first intra frame I it is possible, that the switching module 12 or the switching apparatus 9 requests a intra frame from the respective camera 7 as soon as the switch request SR arrives.

It shall be underlined, that the numbering of the input video streams are relative, so that in a next switching step the output video stream is switched from the second input video stream to the first video input stream. It is also possible, that further input video streams are used and switched into the output video stream. In further embodiments it is possible to cascade a plurality of the switching apparatus 1 in order to save bandwidth over larger distances.
1 conference system
2 delegate units
3 microphone
4 participant
5 control module
6 loudspeaker
7 cameras
8 network
9 switching apparatus
10 display
11 receiver
12 switching module
13 time stamp module
14*a, b* cache module

The invention claimed is:

1. A switching apparatus for switching compressed video streams, the switching apparatus comprising:
   at first input and a second input, each of the first and second inputs being operable to receive an input video stream from a camera;
   an output for outputting an output video stream,
   wherein the input video streams are compressed video streams, wherein each compressed video stream is represented by a sequence of groups of frames, wherein each group of frames includes a key frame and at least one inter frame;
   a switching module operable to receive a switch request and to switch the input video streams in the output video stream, so that a first compressed video stream of the input video streams is stopped and a second compressed video stream of the input video streams is started, wherein the output video stream is a compressed video stream;
   wherein the switching module is configured to stop the first compressed video stream after a frame is completely transferred to the output video stream and before the transfer of a next frame of the first compressed video stream to the output video stream is started; and
   wherein the switching module is configured to start the transmission of the second compressed video stream in the output video stream with a cached key frame, wherein the cached key frame is prior than the last frame of the first compressed video stream being transmitted to the output video stream.

2. The switching apparatus according to claim 1, wherein the switching module is operable to start the transmission of the second compressed video stream in the output video stream with a key frame.

3. The switching apparatus according to claim 1, wherein the key frame is an I-frame, wherein the at least one inter frame is a P-frame or a B-frame, or wherein the video streams are compressed according to the MPEG Standard.

4. The switching apparatus according to claim 1, wherein the switching apparatus is operable to be connected to the input of the first and of the second compressed video streams, when the first compressed video stream is stopped in the output video stream, the second compressed video stream is started in the output video stream, or both.

5. The switching apparatus according to claim 1, wherein the switching apparatus is operable to disconnect the first input when the first compressed video stream is stopped in the output video stream and to connect the second input when the second compressed video stream is started in the output video stream.

6. The switching apparatus according to claim 1, wherein the switching apparatus includes a cache module for caching the second compressed video stream.

7. The switching apparatus according to claim 1, wherein the switching apparatus includes a timestamp module, wherein the timestamp module is operable to adapt the time stamps on the second compressed video stream so that the adapted time stamps correspond in time with the timestamps of the first compressed video stream in the output video stream, with the timestamps of the previous frames in the output video stream, or both.

8. The switching apparatus according to claim 7, wherein the temporal distance between the adapted time stamps is the same as the temporal distance between the original time stamps of the second compressed video stream.

9. The switching apparatus according to claim 7, wherein the temporal distance between the adapted time stamps is smaller as the temporal distance between the original time stamps of the second compressed video stream until a delay caused by the caching of the second compressed video stream is compensated.

10. The switching apparatus according to claim 1, wherein the switching apparatus is adapted to work in realtime or wherein the video streams are live video streams.

11. The switching apparatus according to claim 1, wherein the switching apparatus is operable to request a key frame from the camera providing the second compressed video stream.

12. A conference system with a plurality of delegate units, each delegate unit comprising;
   a microphone for a participant;
   a plurality of cameras, wherein each camera provides a video stream and a display; and
   a switching apparatus having
      a first input and a second input, each of the first and second inputs being operable to receive an input video stream from a camera;
      an output for outputting an output video stream,
         wherein the input video streams are compressed video streams, wherein each compressed video stream is represented by a sequence of groups of frames, wherein each group of frames includes a key frame and at least one inter frame;
      a switching module operable to receive a switch request and to switch the input video streams in the output video stream, so that a first compressed video stream of the input video streams is stopped after a frame is completely transferred to the output video stream and before the transfer of a next frame of a second compressed video stream of the input video streams is started, wherein the output video stream is a compressed video stream wherein the plurality of cameras are connected to the inputs and the display is connected to the output; and
      wherein the switching module is configured to start the transmission of the second compressed video stream in the output video stream with a cached key frame, wherein the cached key frame is prior than the last frame of the first compressed video stream being transmitted to the output video stream.

13. The conference system according to claim 12, further comprising a control module for controlling the switching apparatus, wherein a first of the plurality of cameras is directed at a first delegate unit and a second of the plurality of cameras is directed at a second delegate unit, and wherein the control module is operable to send the switch request to the switching apparatus for switching from the video stream of the first camera to the video stream of the second camera to the output video stream in dependence from switching the first delegate unit as an active delegate unit to the second delegate unit as the active delegate unit.

14. A method for switching video streams with the switching apparatus according to claim 1, the method comprising the step of receiving a switch request and switching the input video streams in the output video stream, so that the first compressed video stream of the input video streams is stopped and the second compressed video stream of the input video streams is started in the output video stream.

15. The switching apparatus according to claim 1, wherein the key frame is an I-frame, wherein the at least one inter frame is a P-frame or a B-frame, and wherein the at least two input video streams are compressed according to the MPEG Standard.

16. The switching apparatus according to claim 1, wherein the switching apparatus is adapted to work in realtime and wherein the video streams are live video streams.

17. A method for switching video streams with the conference system according to claim 13, the method comprising the step of receiving a switch request and switching the input video streams in the output video stream, so that the first compressed video stream of the input video streams is stopped and the second compressed video stream of the input video streams is started in the output video stream.

* * * * *